(12) United States Patent
Bouchard (10) Patent No.: US 7,360,124 B2
(45) Date of Patent: Apr. 15, 2008

(54) AUTONOMOUS NETWORK FAULT DETECTION AND MANAGEMENT SYSTEM

(75) Inventor: Magella Bouchard, Outremont (CA)

(73) Assignee: Viasat Geo-Technologie Inc., Montréal (CA)

( * ) Notice: Subject to any disclaimer, the term of this patent is extended or adjusted under 35 U.S.C. 154(b) by 541 days.

(21) Appl. No.: 11/053,415

(22) Filed: Feb. 9, 2005

(65) Prior Publication Data

US 2006/0179355 A1     Aug. 10, 2006

(51) Int. Cl.
*G06F 11/00* (2006.01)
(52) U.S. Cl. ............... 714/47; 379/22.03; 342/459
(58) Field of Classification Search ............ 714/42, 714/47; 379/22.03; 342/459
See application file for complete search history.

(56) References Cited

U.S. PATENT DOCUMENTS

| | | | |
|---|---|---|---|
| 4,814,711 A | 3/1989 | Olsen et al. | |
| 5,294,937 A | 3/1994 | Ostteen et al. | |
| 5,699,056 A | 12/1997 | Yoshida | |
| 5,777,662 A | 7/1998 | Zimmerman | |
| 5,920,846 A * | 7/1999 | Storch et al. | ............... 705/7 |
| 5,933,100 A | 8/1999 | Golding | |
| 6,005,518 A | 12/1999 | Kallina | |
| 6,198,914 B1 * | 3/2001 | Saegusa | ............... 455/404.2 |
| 6,516,267 B1 | 2/2003 | Cherveny et al. | |
| 6,577,943 B2 | 6/2003 | Nakao et al. | |
| 6,671,824 B1 * | 12/2003 | Hyland et al. | ............... 714/26 |
| 6,711,535 B2 | 3/2004 | Ford et al. | |
| 6,801,162 B1 * | 10/2004 | Eckenroth et al. | ............... 342/418 |
| 2003/0139909 A1 | 7/2003 | Ozawa | |
| 2004/0077347 A1 | 4/2004 | Lauber et al. | |
| 2006/0242072 A1 * | 10/2006 | Peled et al. | ............... 705/51 |

* cited by examiner

*Primary Examiner*—Marc Duncan
(74) *Attorney, Agent, or Firm*—Ogilvy Renault, LLP (57) ABSTRACT

The invention provides an autonomous geo-referenced fault data detection, storage and management system and method for transmission line network such as cable distribution networks, based on an application server architecture, wherein autonomous means automatic and without the need of human intervention. The system comprises a server having a database and a network interface adapted to be linked to a communication network, the network interface for receiving and relaying data to the server, the data comprising at least one of fault data and management data, the fault data comprising at least one of geo-referenced ingress data and geo-referenced egress data and the management data comprising at least one of user data, administrator data and fault status data, the server autonomously updating the database by incorporating the relayed data in the database to provide a stored data.

21 Claims, 6 Drawing Sheets

AUTONOMOUS NETWORK FAULT DETECTION AND MANAGEMENT SYSTEM

FIELD OF THE INVENTION

The invention relates to methods and systems to detect faults in transmission line networks and manage this information. In particular, the invention relates to autonomous methods and systems that do not require human intervention.

BACKGROUND OF THE ART

Most cable distribution networks still use coaxial cables. In order to avoid any interference communication between RF signals distributed by a cable network and other RF signals from other communication channels, the integrity of the cable network must be assured. Thus the cable network must be continuously assessed to find faults and these faults must thereafter be repaired.

The integrity of a transmission line can be verified by measuring the signal leakage from the line. In the case of coaxial cables used in cable distribution networks, an RF leakage is measured. Instruments that measure RF leakage are known in the art. Generally, such instruments use an antenna for receiving the RF leakage and have a GPS to determine their latitude and longitude.

In order to assess the integrity of the whole cable network, audit patrols are used to systematically map a cable distribution network. An audit patrol generally comprises a fleet of dedicated vehicles, all equipped with a RF leakage detector, the vehicles travel on the cable network territory according to a pre-determined itinerary, searching for RF leaks.

Results from these audit patrol are then used to create maps of the cable distribution network on which the faults are shown. From these maps, work orders can be established to correct the faults, thus assuring the integrity of the cable network.

One drawback of audit patrols is that since they require a fleet of dedicated vehicles, they are quite expensive systems to maintain.

Features of the invention will be apparent from review of the disclosure, drawings and description of the invention below.

SUMMARY

The invention provides an autonomous geo-referenced fault data storage and management system for a transmission line network, based on an application server architecture, wherein autonomous means automatic and without the need of human intervention. The system comprises a server comprising a database and a network interface, wherein the network interfaces receives and relays data to the server, the data comprising at least one of fault data and management data, the fault data comprising at least one of geo-referenced ingress data and geo-referenced egress data, the management data comprising at least one of user data, administrator data and fault status data, and wherein the data server autonomously updates the database by incorporating the relayed data in the database to provide a stored data.

The invention also provides at least one vehicle equipped with an automatic fault detection device (AFDD), wherein the AFDD is adapted to autonomously detect a fault in the transmission line network while the vehicle is traveling in a territory occupied by the transmission line network and wherein the AFDD is adapted to autonomously relay the detected fault as fault data to the communication network, for providing an autonomous fault detection and management system.

The invention also provide a method, based on an application server architecture, for providing an autonomous geo-referenced fault data storage and management for a transmission line network. The method comprises receiving data and autonomously relaying the data to a server, wherein the data comprises at least one of fault data and management data, and wherein the fault data comprising at least one of geo-referenced ingress data and geo-referenced egress data and wherein the management data comprises at least one of user data, administrator data and fault status data. The method also comprises autonomously updating, through the server, the database by incorporating the relayed data in the database to provide a stored data.

The invention also provides the above method and provides at least one vehicle equipped with an automatic fault detection device, wherein the automatic fault detection device is adapted to detect egress data, to geo-referenced it and adapted to transmit the geo-referenced egress data as the fault data to the communication network, with the automatic fault detection device, autonomously detecting and geo-referencing egress data while the vehicle is traveling in a territory occupied by the transmission line network, and transmitting the fault data to the communication network. The method also comprises providing a vehicle following a trajectory not intended for fault detection to provide the fault data as a non-audit fault data.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

In this disclosure, the term autonomous is used to qualify a device or a method that works automatically and without the need of a human intervention.

Also in this disclosure, the term "transmission line" comprises coaxial cable and the term "transmission line network" comprises a cable distribution network.

Figure 1:
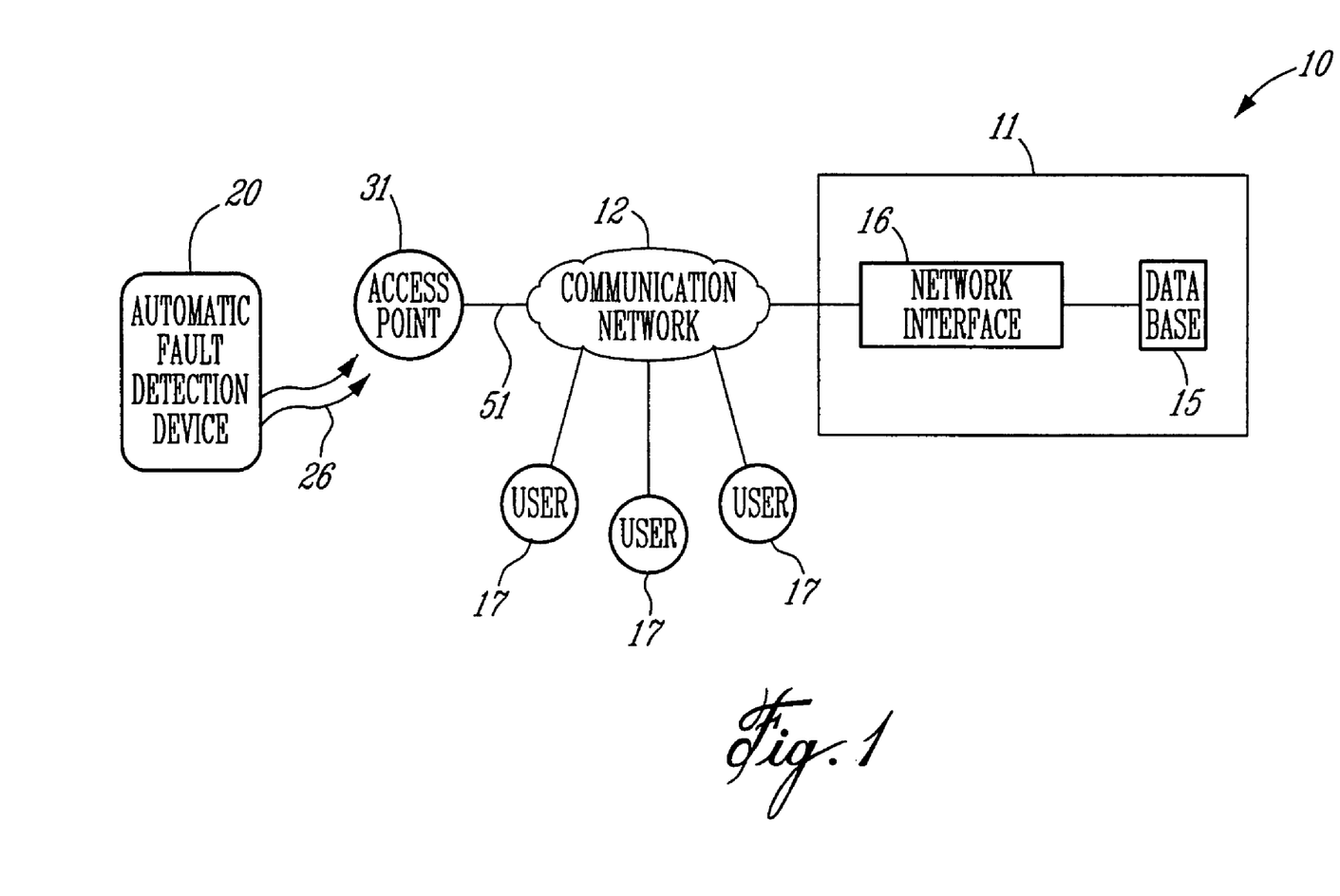
FIG. 1 is a block diagram of an autonomous fault data storage and management system (FMS) based on a application server architecture, in accordance with an embodiment of the present invention, the FMS receiving a wireless fault signal from an automatic fault detection device (AFDD)

In one embodiment of the present invention, an autonomous fault data storage and management system (FMS) 10, based on application server architecture, is provided to receive and store, automatically and without human intervention, a detected fault on a transmission line, the transmission line being one coaxial cable of a distribution cable network. FIG. 1 illustrates this embodiment.

According to this embodiment, the FMS 10 comprises a server 11 with a database 15 and a network interface 16, that may be linked to a communication network 12. FIG. 1 also shows an automatic fault detection device (AFDD) 20 wirelessly transmitting a wireless fault signal 26 to an access point 31, which in turn provides geo-referenced fault data 51 to communication network 12. Users 17 can access the database 15 through the communication network 12.

Figure 2:
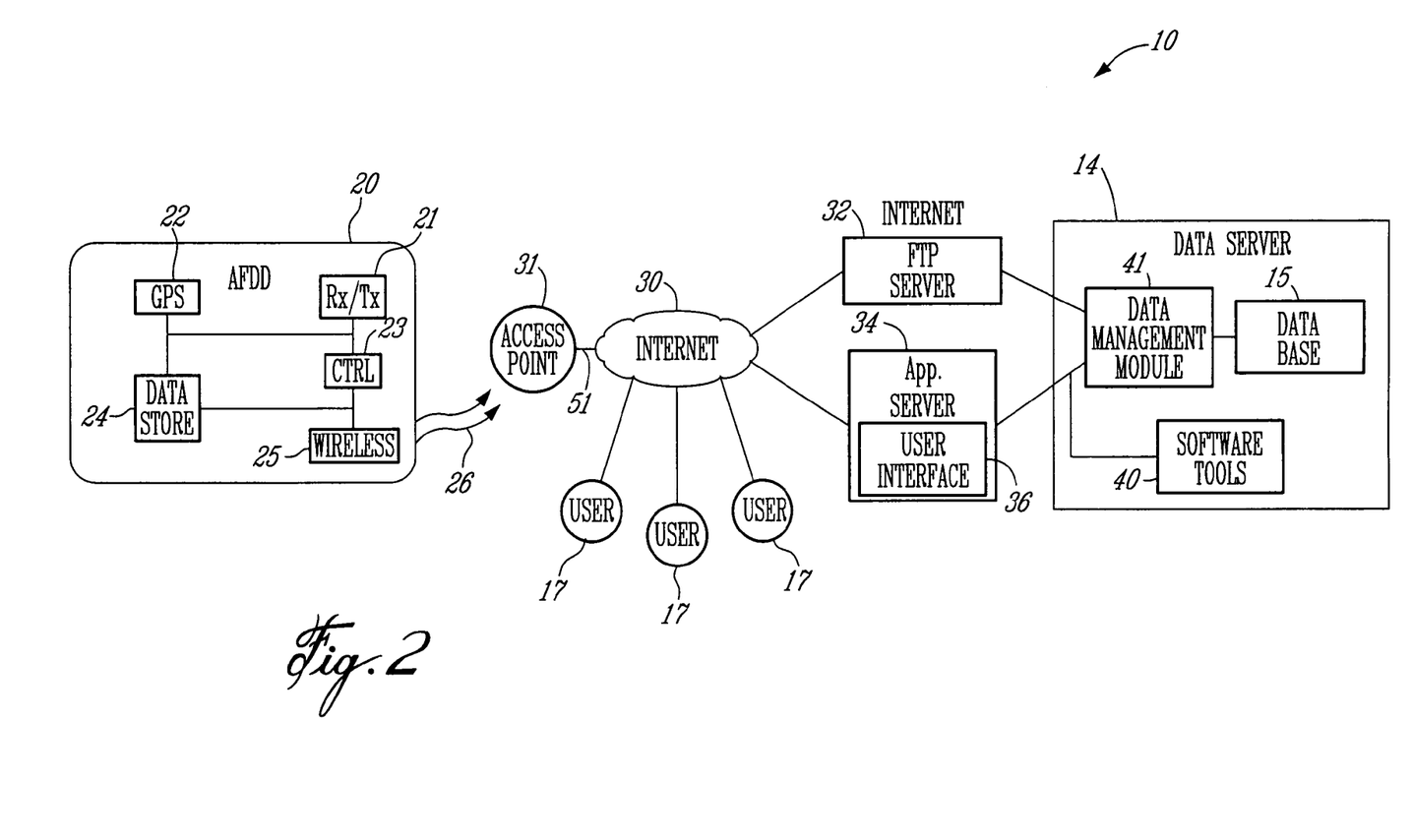
FIG. 2 is a block diagram of the FMS of FIG. 1, in accordance with an embodiment of the present invention, in the case where the communication network is the Internet and gives more detail on the content of the AFDD.

As illustrated in FIG. 2, in one embodiment of the present invention, server 11 comprises three servers: a data server 14 which comprises the database 15, a data exchange server (not shown) (for example a FTP server 32, as illustrated in FIG. 2) and an application server 34. Data exchange server and application server 34 are the network interface 16 of the server 11 with the communication network 12. For communication with users 17, the application server 34 serves as the network interface, whereas for relaying geo-referenced fault data 51 to the server 11, the data exchange server (here a FTP server 32) serves as the interface. Application server 34 is also responsible of managing data flow via the data exchange server.

According to FIG. 2, an automatic fault detection device (AFDD) 20 located in the range of a RF leakage 27 from a transmission line 46 automatically detects the RF leakage 27, automatically associates it to a longitude and a latitude in order to provide geo-referenced fault data 51 and automatically relays the geo-referenced fault data 51 to the communication network 12 via an access point 31. All the above steps are furthermore performed without human intervention. Although in this embodiment the geo-referenced fault 51 is relayed to the communication network 12 wirelessly via wireless fault signal 26, it will be obvious for someone skilled in the art that other relaying means are possible, such as, for example, momentarily store detected fault data on a portable storage device and later on download the content of the portable storage device in the communication network 12.

The communication network 12 receives the fault data 51 and relays it to the data server 14 which incorporates autonomously the fault data 51 in the database to provide a stored data FIG. 2 illustrates a FMS 10 in the case where the communication network includes Internet 30. In one embodiment of the present invention, fault data 51 are received by a FTP server 32, through Internet 30, which relays fault data 51 to the data server 14. The data server 14 comprises a data manager module 41 which manages access to the database 15 and which is responsible for the autonomous updating of the database 15. Software tools 40 are also provided to analyze stored data and to provide management tools for the maintenance of the network. An application server 34 is provided to manage user access to the FMS 10 and to provide a user interface 36, which enables users to consult and analyze stored data via Internet 30. The present invention thus provides an autonomous fault data storage and management system 10 based on an application server architecture 38.

FIG. 2 gives also more detail on the content of the AFDD 20. A RF receiver/transmitter (RX/TX) module 21 is provided to either detect RF leakage 27 via the receiver, for egress measurement, or transmit a RF signal via the transmitter, for ingress RF measurement and assessment of the cable network. The AFDD 20 contains also a GPS module 22 to provide a geo-reference to a signal that is transmitted or received by the RX/TX module 21.

Figure 3:
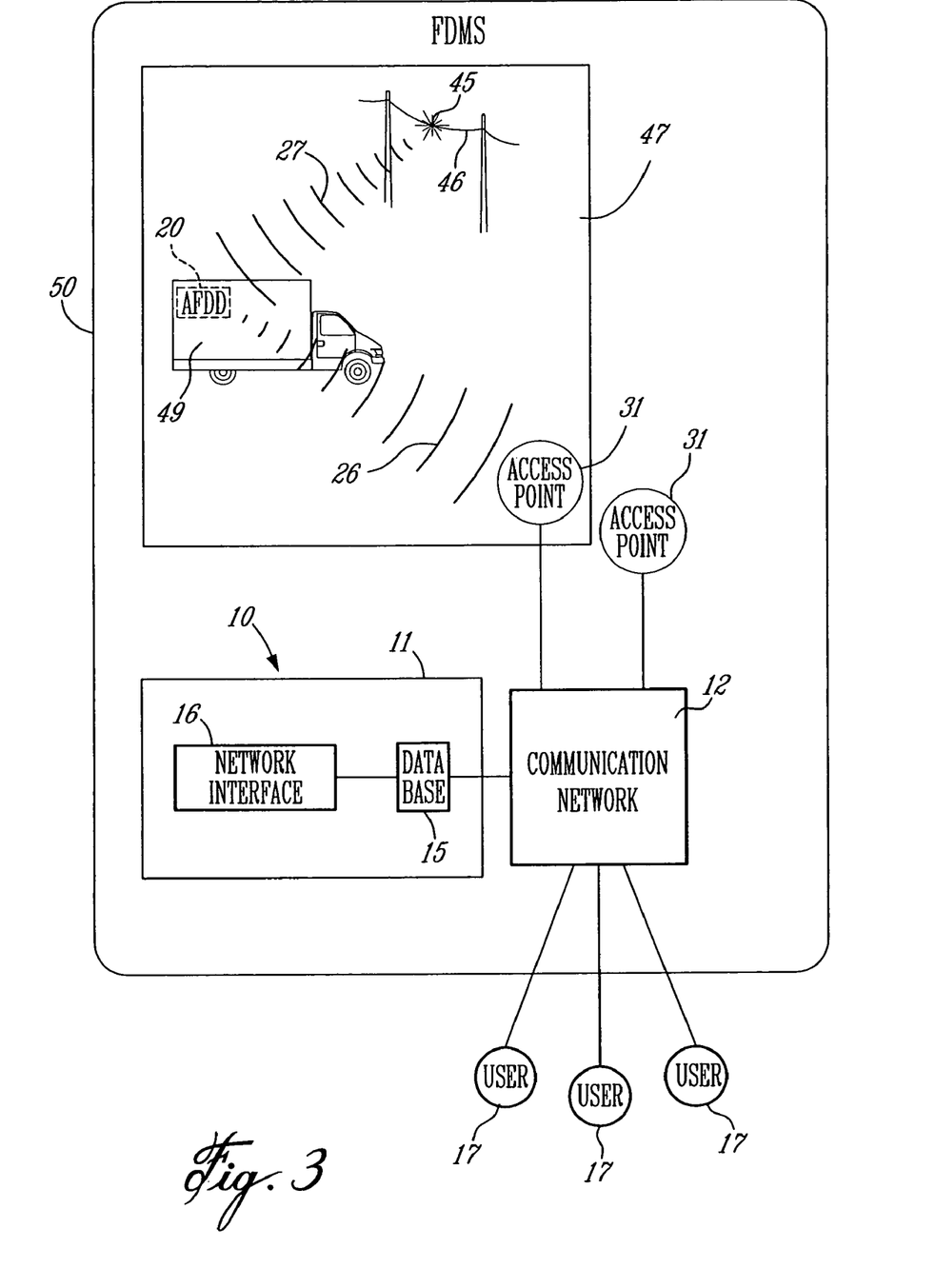
FIG. 3 is a block diagram of an autonomous fault detection and management system (FDMS), in accordance with an embodiment of the present invention.

A controller 23 automatically manages the operation of the AFDD 20: the controller receives detected RF leakage 27 (egress measurement) or orders the transmitter to send a RF signal (ingress measurement). The controller 23 also controls the wireless module 25 which transmits, to the communication network 12, wireless fault signal 26 corresponding to a geo-referenced detected RF leakage 27 (FIG. 3). Data storage 24 is also provided, so that geo-referenced detected RF leakage 27 (FIG. 3) can be momentarily stored and later on transmitted in a batch.

Turning now to FIG. 3, a fault detection and management system (FDMS) 50 in accordance with an embodiment of the present invention will be described. The FDMS 50 comprises the FMS 10 described above and at least one vehicle 49 that roves the cable network territory 47. Vehicles 49 are equipped with the AFDD 20 so that they can either provide ingress measurement or egress measurement. FIG. 3 illustrates the case where the AFDD 20 is performing egress measurement: a fault 45 on a transmission line 46 is detected by the AFDD 20 placed in the vehicle 49 and a corresponding wireless fault signal 26 is automatically, and without any human intervention, transmitted to the FMS 10 via access point 31 and communication network 12. FMS 12

Figure 4:
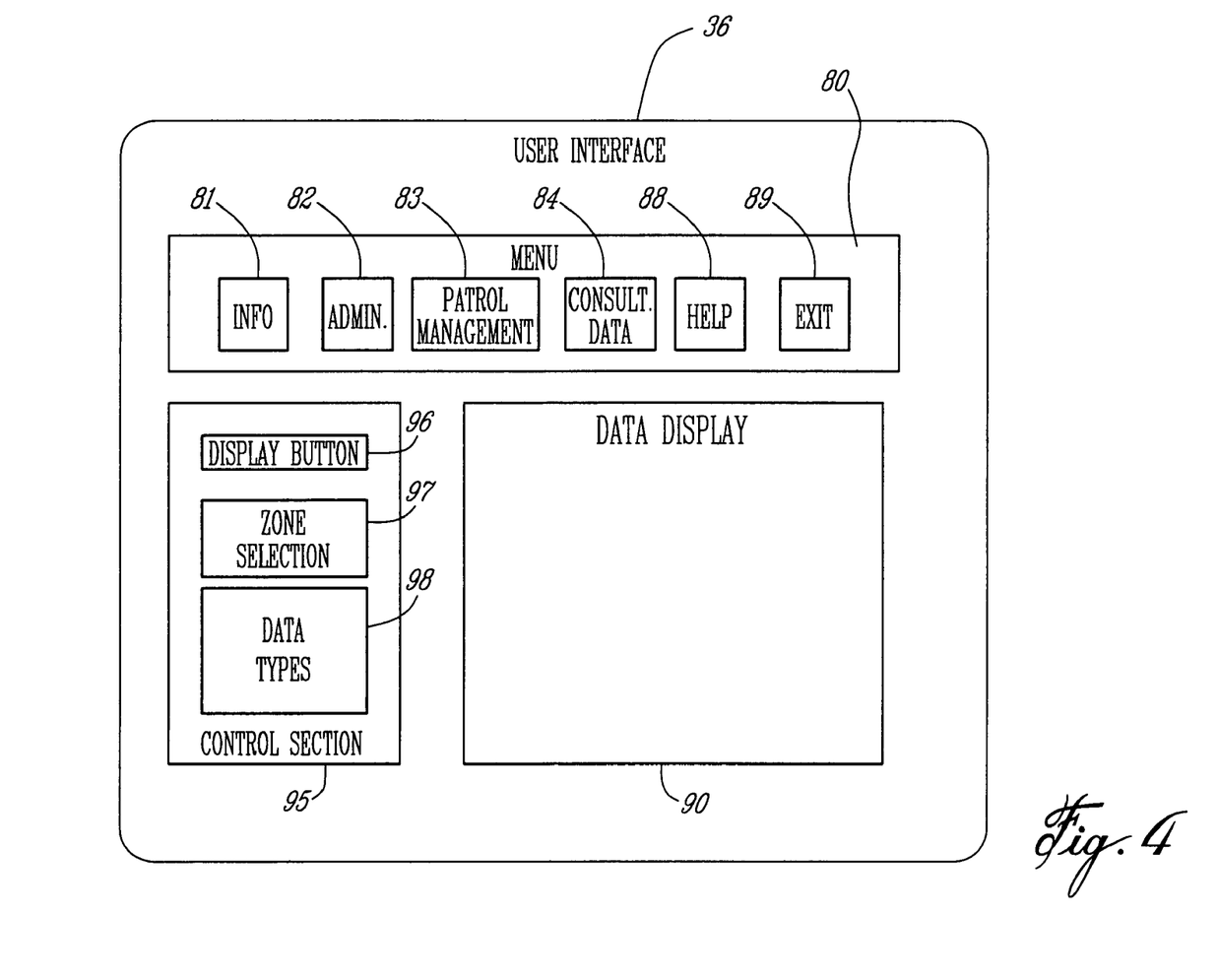
FIG. 4 is a schematic view of a user interface provided by the FMS and the FDMS systems, in accordance with an embodiment of the present invention.

In an embodiment of the present invention, the user interface 36, as illustrated in FIG. 4, enables a user 17 to consult data from the database 15 and manage patrols to assure the integrity of the cable network.

The user interface 36 comprises three main sections: a menu section 80, a data display section 90 and a control section 95. Using the menu section 80, user can select between several buttons: info 81, patrol management 83, consult data 84, help 88 and exit 89. An administrator button 82 is only active when the user is the administrator of the application server 34. By selecting the patrol management button 83, a user 17 can prepare work orders in view, for example, of sending a repair team to repair a fault 45 on the cable network or sending a patrol to verify a detected leak 27. By selecting the consult data button 84, a user 17 can be informed of the present leakage state of the cable network. The control section 95 enables user 17 to control several consultation modes of the data from the database 15. With display button 96, user 17 can select between a graphical display of data or a table display of data. Data are accordingly displayed in the data display window 90. User 17 can select what portion of the cable network territory 47 he/she wants to assess using the zone selection buttons 97. User 17 can either select the whole region, a city, or a particular sector of the cable network territory 47. By doing so, display in the data display window 90 adjusts automatically accordingly to the user's choice. Button 98 enables user 17 to select several type of data to display. For example, recent leakage data or a time-average of leakage data may be displayed. Also, management data can be displayed and accessed, so that user 17 may update management data. Also analysis algorithms can be selected to perform analysis of the data.

Figure 5:
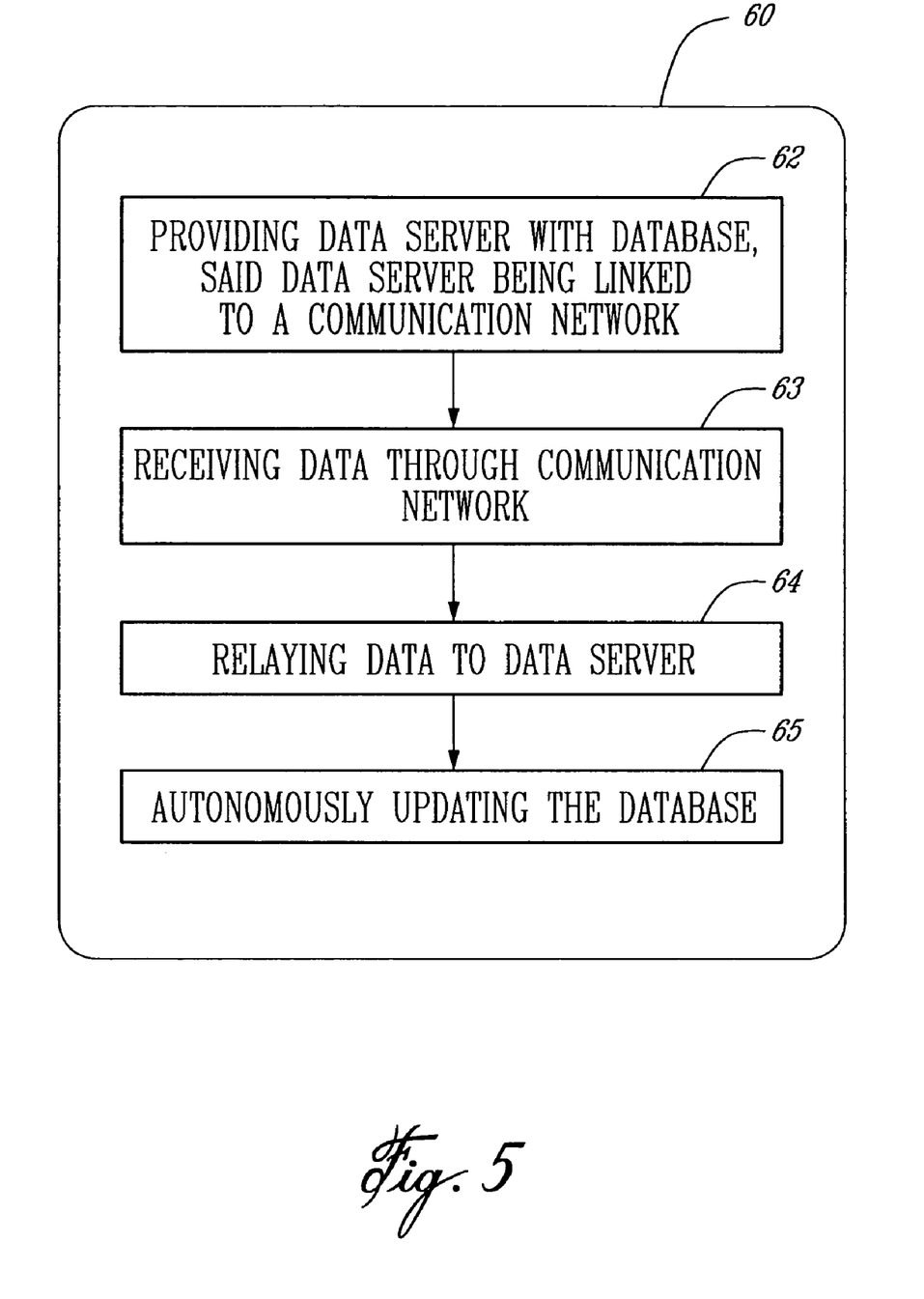
FIG. 5 is a flowchart of a method, based on application server architecture, for providing an autonomous geo-referenced fault data storage and management of a cable network, in accordance with an embodiment of the present invention.

Turning now to FIG. 5, an embodiment of a method, based on an application server architecture, for providing an autonomous geo-referenced fault data storage and management of a cable network, will be described.

The method 60 comprises providing a data server comprising a database, wherein the data server is linked to a communication network (step 62). As previously mentioned, communication network 12 may be Internet 30 or can be any other communication network such as, for example, an intranet network. Then, the method 60 comprises receiving data through the communication network (step 63) and relaying the data autonomously to the data server (step 64). Then, the data server autonomously updates the database (step 65).

As previously discussed, the data may be geo-referenced fault data 51, which may include geo-referenced ingress data or geo-referenced egress data, or it can be management data. Geo-referenced egress data, as previously discussed, might be sent by an AFDD 20. Geo-referenced ingress data might be sent by a central station of the network (also called the head end in the case of cable distribution networks), wireless or directly through the communication network 12 by conventional or optical wire, upon receiving a RF signal emitted by the TX of an AFDD 20 located near a fault 45 in the cable network. Management data can be sent by user 17 through the user interface 36 and the communication network 12. Management data might also be sent by the system administrator. Thus, management data can be user or administrator data; it can also be information concerning a particular ingress/egress data. For example, it can be fault status data which is associated to a particular fault data 51, in order to indicate if the fault 45 was repaired, ordered to be repaired, or else.

When receiving the geo-referenced fault data 51, the data server 14 via its data manager module 41 updates the database 15 by incorporating the received data. In order to avoid any redundancy or misleading information in the database 15, data server 14 verifies if the received data should or should not be included in the database 15. The integrity of the received data is verified and a search of possible redundancy is performed. In order to do so, a geo-referenced fault data range is associated to the received fault data 51, wherein the geo-referenced fault data range is given according to the intensity of the fault data. In one embodiment of the present invention, the geo-referenced fault data range is proportional to the intensity of the fault data. That means that higher intensity fault data have larger geo-referenced fault data range. The data server 14 searches in the database 15 for any geo-referenced stored data that would be located within the geo-referenced fault data range. This provides a found stored data. Then the data server 14 selects between the found stored data and the fault data 51 one that has the highest intensity. If the selected data is the fault data 51, the data server 14 replaces in the database 15 the found stored data by the fault data 51 and if the selected data is the found stored data 54, the data server 14 do not include in the data base 15 the fault data 51. Of course, as it will be obvious for someone skilled in the art, many other criteria can be used and/or other steps performed for comparing data and selecting between the newly acquired fault data and the stored data in the data base, and all those possible ways to autonomously updating the data base avoiding redundancy are part of the present invention.

As someone skilled in the art will appreciate, the present invention enables the mapping of a network territory 47 in search of possible faults 45 independently of human intervention. Practically, this means that a vehicle 49 not intended for this mapping, but equipped with an AFDD 20, can autonomously acquire fault data 51 (egress data) and transmit the data to the FMS 10, while traveling on the network territory 47, or transmit data in batch between two travels. Thus the database 15 can always be updated by receiving this information continuously or in batch. Similarly, the vehicle 49 can, while traveling, send a RF signal such that a central station of the cable network (head end) will be able to detect an ingress fault. Again this information after being autonomously relayed to the FMS 10, serves to update on a continuous basis the database 15.

Thus the content of the database 15 does not rely only on audit patrols but may be updated between such audit patrols by roving vehicles 49 traveling on the network territory 47 for other purposes than to measure faults 45.

Figure 6:
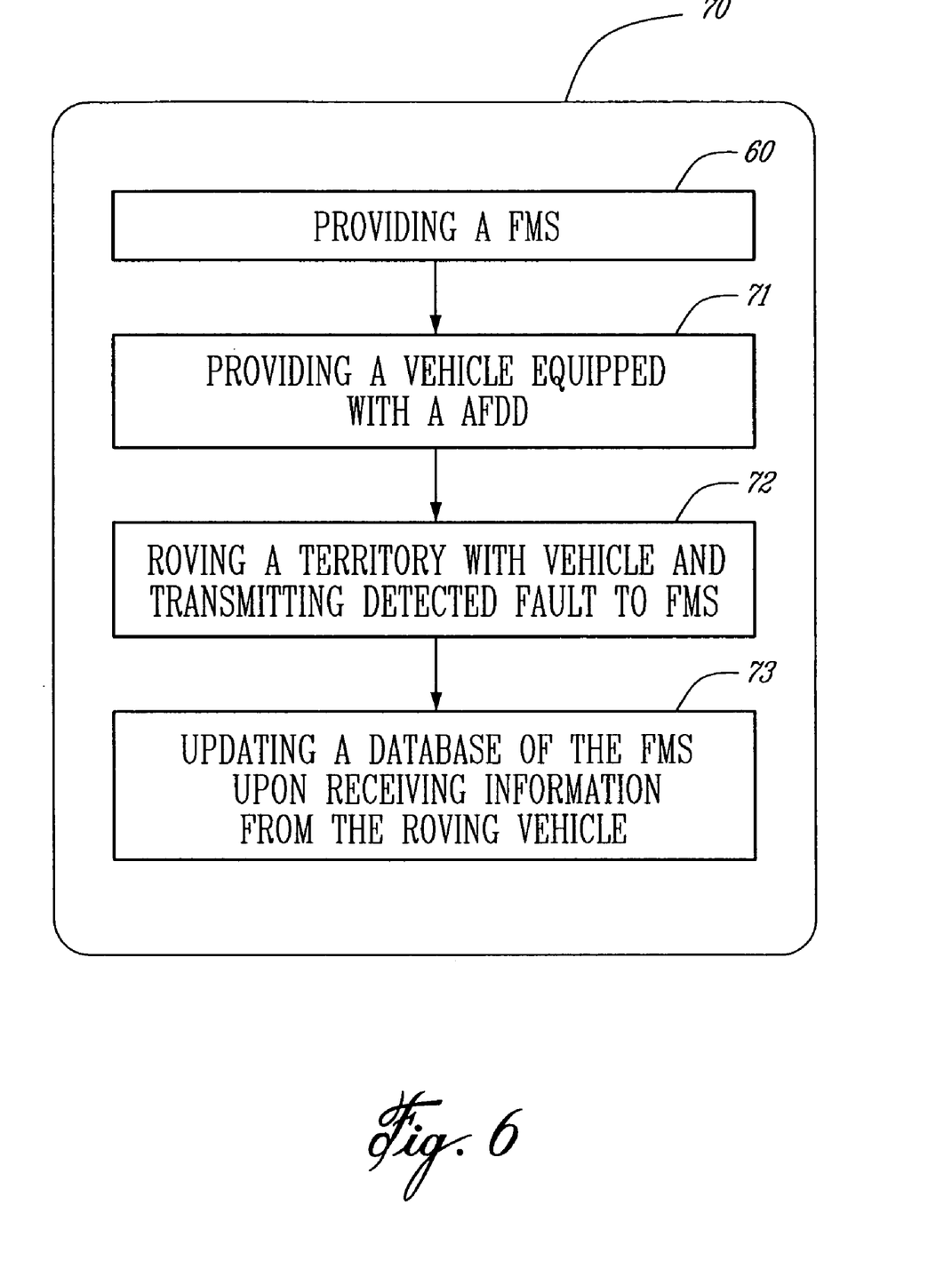
FIG. 6 is a flowchart of a method for continuously updating of a database using a roving patrol, in accordance with an embodiment of the present invention.

FIG. 6 is a flowchart of a method 70 of such continuous updating of database 15 using a roving patrol, in accordance with an embodiment of the present invention. The method 70 comprises providing a FMS 10 (step 60). Also the method 70 comprises providing a vehicle 49 equipped with an AFDD 20 (step 71). Then the method 70 comprises roving the network territory 47 with the vehicle 49 and transmitting via the AFDD 20 a detected fault 45 to the FMS 10 (step 72). The method 70 also comprises updating the database 15 of the FMS 10 upon receiving the information sent by the roving vehicle 49 (step 73).

Although the present invention has been described in the context of a cable distribution network, a person skilled in the art will understand that it may also be embodied in any other environments comprising transmission lines. For example the present invention could be embodied in the context of electric power distribution networks.

Although the present invention has been described hereinabove by way of specific embodiments thereof, it can be modified, without departing from the spirit and nature of the subject invention as defined herein. The scope of the invention is therefore intended to be limited solely by the scope of the appended claims.

I claim:

1. An autonomous geo-referenced fault data storage and management system for a transmission line network, the system comprising:

a server comprising a data server and a network interface adapted to be linked to a communication network, the data server comprising a database and a filtering module;

said network interface comprising an application server for receiving and relaying management data to the server, and a data exchange server for receiving and relaying fault data to the server, the fault data comprising at least one of geo-referenced ingress data and geo-referenced egress data, and the management data comprising at least one of user data, administrator data and fault status data, said server for autonomously updating the database by incorporating the relayed data in said database to provide stored data, said filtering module for autonomously avoiding a redundancy between said relayed data and said stored data when updating said stored data.

2. The system of claim 1, wherein said network interface is also for linking a user to the server.

3. The system of claim 1, wherein said data exchange server comprises an FTP server for receiving and relaying said fault data.

4. The system of claim 1, wherein said data server comprises a manager module for managing an access of said database to said user.

5. The system of claim 1, wherein said data server comprises a software tool module for analyzing said stored data.

6. The system of claim 5, wherein said software tool module further comprises management software for managing fault repair works on said transmission line network.

7. The system of claim 1, wherein said communication network is linked to at least one access point for receiving a wireless fault signal for providing said fault data.

8. The system of claim 7, wherein said communication network comprises an internet network.

9. The system of claim 1, further comprising:
at least one vehicle equipped with an automatic fault detection device (AFDD), wherein the AFDD is adapted to autonomously detect a fault in said transmission line network while the vehicle is traveling in a territory occupied by said transmission line network and wherein the AFDD is adapted to autonomously transmit said wireless fault signal to said access point, wherein said wireless fault signal corresponds to said detected fault, for providing an autonomous fault detection and management system.

10. The system of claim 9, wherein said traveling vehicle comprises a vehicle following a trajectory not systematically intended for fault detection.

11. A method, based on an application server architecture, for providing an autonomous geo-referenced fault data storage and management for a transmission line network, the method comprising:
receiving data and autonomously relaying said data to a server, wherein said data comprises at least one of fault data and management data, and wherein the fault data comprises at least one of geo-referenced ingress data and geo-referenced egress data and wherein the management data comprises at least one of user data, administrator data and fault status data; and
autonomously updating a database by incorporating the relayed data in the database to provide stored data;
wherein said autonomously updating comprises autonomously avoiding a redundancy in the database by:
associating to said fault data a geo-referenced fault data range in relationship with an intensity of said fault data;
finding in the database a found geo-referenced stored data located within said geo-referenced fault data range;
selecting between said found geo-referenced stored data and said fault data to provide a selected data, wherein the selected data has the highest intensity; and
if the selected data is the fault data, replacing in the database the found geo-referenced stored data by the fault data: and
if the selected data is the found stored data, not including the fault data in the database.

12. The method of claim 11, wherein said receiving and relaying comprises receiving and relaying said data through a communication network.

13. The method of claim 12, further comprising giving a user access to the database via the communication network.

14. The method of claim 11, wherein said updating comprises adjusting accordingly to a present state of the transmission line network, a status of a fault data, wherein said status indicates if the fault data was repaired.

15. The method of claim 14, comprising providing said access to said user to the database via a user interface, wherein said access allows at least one of consulting data, analyzing data, changing the fault data status and associating management data to stored data.

16. The method of claim 11, further comprising:
providing at least one vehicle equipped with an automatic fault detection device, wherein the automatic fault detection device is adapted to detect and to geo-reference egress data and adapted to relay the geo-referenced egress data as said fault data to said communication network;
with said automatic fault detection device, autonomously detecting and geo-referencing said egress data while said vehicle is traveling in a territory occupied by the transmission line network, and transmitting said fault data to said communication network.

17. The method as claimed in claim 16, wherein said vehicle traveling on said territory comprises following a trajectory not intended for fault detection to provide said fault data as a non-audit fault data.

18. The method of claim 11, further comprising:
providing at least one vehicle equipped with an AFDD, wherein the AFDD is adapted to autonomously transmit a geo-referenced RF signal;
receiving at a central station of said transmission line network said geo-referenced RF signal through a fault of the transmission line network; and
transmitting from the central station a geo-referenced ingress data to said communication network, upon receiving said geo-referenced RF.

19. The method as claimed in claim 18, wherein said vehicle traveling on said territory comprises following a trajectory not intended for fault detection to provide said fault data as a non-audit fault data.

20. An autonomous geo-referenced fault data storage and management system for a transmission line network, the system comprising:
a server comprising a database and a network interface adapted to be linked to a communication network;
said network interface for receiving and relaying data to the server, the data comprising at least one of fault data and management data, the fault data comprising at least one of geo-referenced ingress data and geo-referenced egress data, and the management data comprising at least one of user data, administrator data and fault status data; and
at least one vehicle equipped with an automatic fault detection device (AFDD), wherein the AFDD is adapted to autonomously detect a fault in said transmission line network while the vehicle is traveling in a territory occupied by said transmission line network, the AFDD being adapted to autonomously relay the detected fault as fault data to said communication network for providing an autonomous fault detection and management system, said at least one vehicle traveling along a trajectory not systematically intended for fault detection,
said server for autonomously updating the database by incorporating the relayed data in said database to provide stored data.

21. An autonomous geo-referenced fault data storage and management system for a transmission line network, the system comprising:
a server comprising a database and a network interface adapted to be linked to a communication network, said network interface for receiving and relaying data to the server, the data comprising at least one of fault data and management data, the fault data comprising at least one of geo-referenced ingress data and geo-referenced egress data, and the management data comprising at least one of user data, administrator data and fault status data, and at least one vehicle equipped with an automatic fault detection device (AFDD), wherein the AFDD is adapted to autonomously transmit a geo-referenced RF signal in said transmission line network while the vehicle is traveling in a territory occupied by said network, said at least one vehicle traveling along a trajectory not systematically intended for fault detection, said server for autonomously updating the database by incorporating the relayed data in said database to provide stored data.

* * * * *